(12) United States Patent
Ozaki

(10) Patent No.: US 9,210,305 B2
(45) Date of Patent: Dec. 8, 2015

(54) IMAGE PICKUP APPARATUS EQUIPPED WITH A SUPPORTING MECHANISM FOR SUPPORTING A VIEWFINDER

(71) Applicant: CANON KABUSHIKI KAISHA, Tokyo (JP)

(72) Inventor: Yoko Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/220,857

(22) Filed: Mar. 20, 2014

(65) Prior Publication Data
US 2014/0293110 A1    Oct. 2, 2014

(30) Foreign Application Priority Data
Apr. 2, 2013    (JP) .................................. 2013-076914

(51) Int. Cl.
*H04N 5/225*    (2006.01)
*H04N 5/232*    (2006.01)

(52) U.S. Cl.
CPC .......... *H04N 5/2251* (2013.01); *H04N 5/23293* (2013.01)

(58) Field of Classification Search
CPC .................................................. H04N 5/23293
See application file for complete search history.

(56) References Cited

U.S. PATENT DOCUMENTS 2,926,728 A * 3/1960 Johannsen et al. ............ 160/191

FOREIGN PATENT DOCUMENTS

JP    2000-188704 A    7/2000
JP    2000188704 A *  7/2000

* cited by examiner

*Primary Examiner* — Gary C Vieaux
(74) *Attorney, Agent, or Firm* — Cowan, Liebowitz & Latman, P.C.

(57) ABSTRACT

An image pickup apparatus that reduces the number of components of a supporting mechanism for a viewfinder. A base member of the mechanism is fixed to the apparatus body, has side wall sections at both sides, and has a linear rail extended along the pulling direction and at least one circular rail extended from the linear rail on each of the side wall sections. A holding member of the mechanism is arranged inside the side wall sections of the base member while holding the viewfinder, has side walls at both sides in the width direction, has supporting shafts for each side wall that are connected to the side wall and can slide along the linear rail, is slidable in the pulling direction with the viewfinder, and is rotatable in a pulled state by moving at least one supporting shaft along the circular rail around the other supporting shaft.

9 Claims, 13 Drawing Sheets

IMAGE PICKUP APPARATUS EQUIPPED WITH A SUPPORTING MECHANISM FOR SUPPORTING A VIEWFINDER

BACKGROUND OF THE INVENTION

1. Field of the Invention

The present invention relates to an image pickup apparatus like a digital camera or a digital video camera. Particularly, the present invention relates to an image pickup apparatus equipped with a supporting mechanism for supporting a viewfinder so as to allow the viewfinder to slide and rotate.

2. Description of the Related Art

FIG. 14A through FIG. 14C are views showing an example of a conventional digital video camera. As shown in FIG. 14A, this digital video camera is configured so that a viewfinder 13 is retracted in an upper section in a rear side (right side in FIG. 14A) of a camera body 105. The viewfinder 13 can be pulled from the camera body 105 by sliding as shown in FIG. 14B, and can be rotated in an up-and-down direction under a pulled state as shown in FIG. 14C. This enables to use the viewfinder 13 after moving to a desired position. Moreover, a fitting part 107 to which accessories are attached is provided on the upper section of the camera body 105 at the side of a subject than the retracted position of the viewfinder 13.

Such a conventional supporting mechanism that supports the viewfinder 13 so as to enable to slide in the pulling direction and to rotate under the pulled state is proposed in Japanese Laid-Open Patent Publication (Kokai) No. 2000-188704 (JP 2000-188704A), for example. FIG. 15A and FIG. 15B show the mechanism disclosed in this publication. FIG. 15A is a perspective view of the supporting mechanism, and FIG. 15B is an exploded perspective view of FIG. 15A.

The supporting mechanism shown in FIG. 15A and FIG. 15B is provided with a base member 21 fixed to the camera body 105, a first slide member 22 arranged inside the base member 21, a second slide member 23 arranged inside the first slide member 22, and a pair of flat spring members 24*f* and 24*r*. The viewfinder 13 is attached to the first slide member 22.

The first slide member 22 is supported so as to be slidable with respect to the base member 21 by putting sliding shafts 25*a*, 25*b*, 25*c*, and 25*d* through four guide slots (two slots per one side) that are horizontally formed on the base member 21. This allows the first slide member 22 to slide in a direction of an arrow H with respect to the base member 21, and the viewfinder 13 can slide in the same direction as a result. It should be noted that two guide slots are horizontally formed on side walls of the second slide member 23, and the second slide member 23 is slidable with respect to the base member 21 and the first slide member 22 by fixing sliding shafts to the first slide member 22 through these guide slots. The upper walls of the first and second slide members 22 and 23 have the function of covering a space, which is made when the viewfinder 13 is extended, in order to prevent the entry of dust.

The flat spring members 24*f* and 24*r* are attached to depressions formed on the both sides in the width direction of the first slide member 22. Moreover, projections of the flat spring members 24*f* and 24*r* are resiliently fitted to slits 21*n*, 21*p*, 21*q*, 21*s*, 21*v*, and 21*w* that are formed on the base member 21 at specified intervals. This gives a click-stop feeling when a user operates the viewfinder 13 to slide in the direction of the arrow H. Moreover, the viewfinder 13 is attached to holes 22*h* and 22*j* formed on the right side of the first slide member 22 through rotating shafts 25*h* and 25*j*, and thereby, the viewfinder 13 can rotate in a direction of an arrow R with respect to the first slide member 22.

However, since the supporting mechanism for the viewfinder 13 in the above-mentioned prior art needs the base member 21, the first slide member 22, and the second slide member 23, and further needs the flat spring members 24*f* and 24*r* for giving the click-stop feeling in the sliding direction, the number of components increases and the configuration also becomes complicated. Moreover, when a click-stop feeling is also given to the rotating direction of the viewfinder 13, a rotation member and a spring member will be further needed, which further increases the number of components.

Furthermore, since the two guide slots (upper and lower slots) must be formed on each side wall of the base member 21, and the slots for giving the click-stop feeling must be formed at the positions other than the guide slots, the base member 21 becomes large in the up-down direction. This makes a camera bigger.

SUMMARY OF THE INVENTION

The present invention reduces the number of components of a supporting mechanism that supports a viewfinder so as to enable to slide in a pulling direction and to rotate under a pulled state, simplifies the configuration of the supporting mechanism, and provides the mechanism that makes an image pickup apparatus be compact.

Accordingly, an aspect of the present invention provides an image pickup apparatus comprising an apparatus body, a viewfinder configured to look at an image of a subject, a supporting mechanism configured to support the viewfinder so as to enable to slide in a pulling direction and to rotate under a pulled state with respect to the apparatus body. The supporting mechanism comprises a base member configured to be fixed to the apparatus body, to have side wall sections at both sides in a width direction, and to form a linear rail extended along the pulling direction and at least one circular rail extended from the linear rail on each of the side wall sections, and a holding member configured to be arranged inside the side wall sections at both sides of the base member while holding the viewfinder, to have side walls at both sides in the width direction, to have supporting shafts for each side wall that are connected to the side wall and can slide along the linear rail, to be slidable in the pulling direction with the viewfinder, and to be rotatable in the pulled state by moving at least one supporting shaft along the circular rail around the other supporting shaft.

According to the present invention, the number of components of the supporting mechanism that supports a viewfinder so as to enable to slide in the pulling direction and to rotate under the pulled state can be reduced, the configuration of the supporting mechanism can be simplified, and the image pickup apparatus can be compact.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
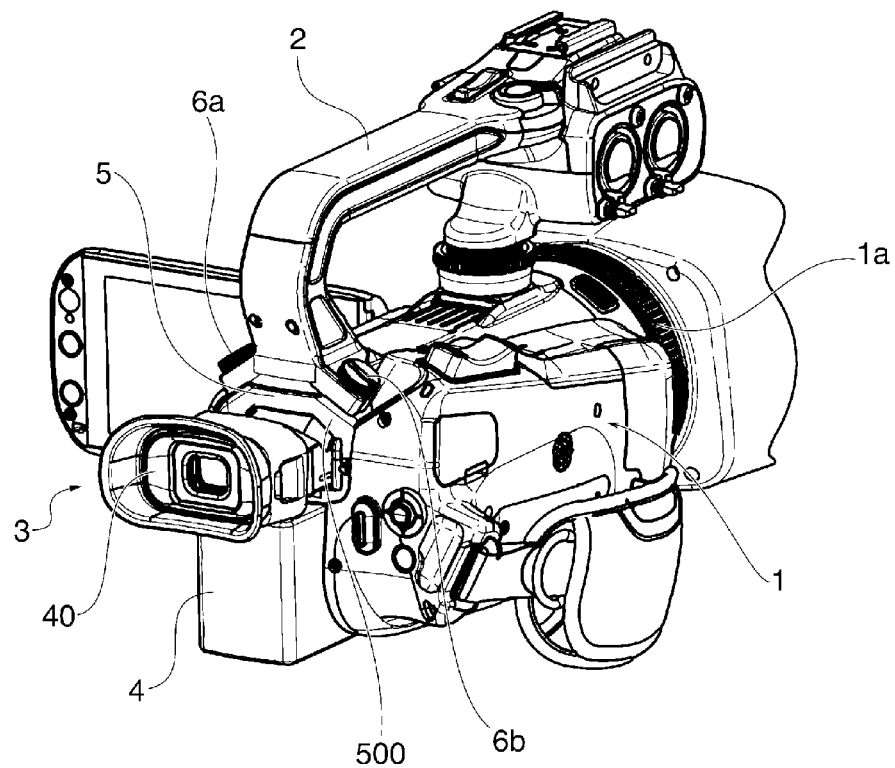
FIG. 1 is a perspective view showing a digital video camera as an image pickup apparatus according to a first embodiment of the present invention viewed from the rear side.
Figure 2:
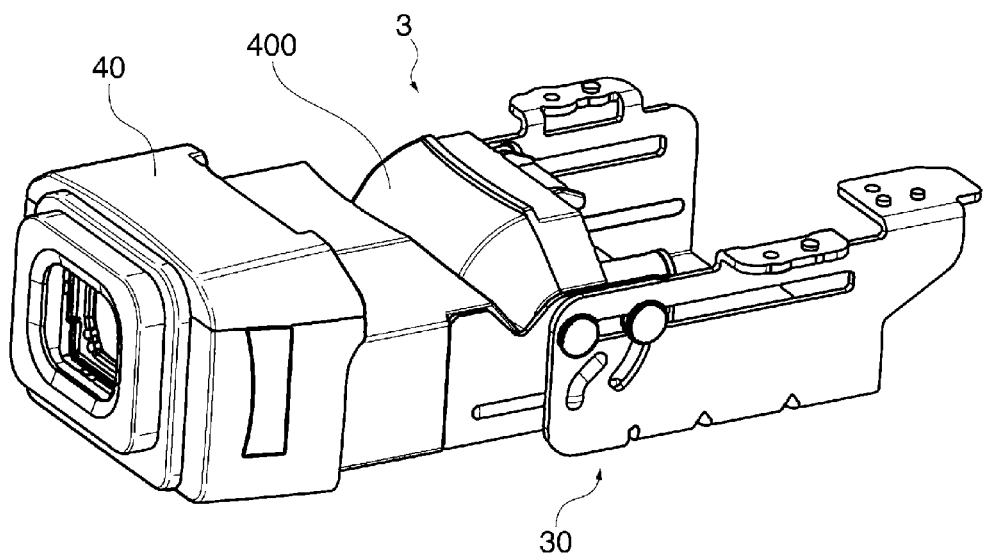
FIG. 2 is a perspective view showing a viewfinder unit of the digital video camera shown in FIG. 1.

FIG. 1 is a perspective view showing a digital video camera as an image pickup apparatus according to a first embodiment of the present invention viewed from the rear side. FIG. 2 is a perspective view showing a viewfinder unit of the digital video camera shown in FIG. 1.

As shown in FIG. 1, the digital video camera of the first embodiment is provided with a viewfinder 40 that is mounted on a rear side of a camera body 1, and a battery 4 that is detachably mounted under the viewfinder 40.

The viewfinder 40 is a device for looking at an image of a subject formed through a lens unit 1a arranged at a front side of the camera body 1. In the first embodiment, the viewfinder unit 3 consists of the viewfinder 40 and a supporting mechanism 30 (see FIG. 2) that supports the viewfinder 40 so as to enable to slide in the pulling direction and to rotate under the pulled state with respect to the camera body 1. It should be noted that FIG. 1 and FIG. 2 show the state where the viewfinder 40 is pulled out from the camera body 1. The camera body 1 is equivalent to an example of the apparatus body of the present invention.

Moreover, a handle 2 is fixed to the upper side of the camera body 1. The handle 2 is fixed to a connector 5 that is located at the upper rear section of the camera body 1 through screw threads 6a and 6b, and the handle 2 is electrically connected with the camera body 1.

Figure 3:
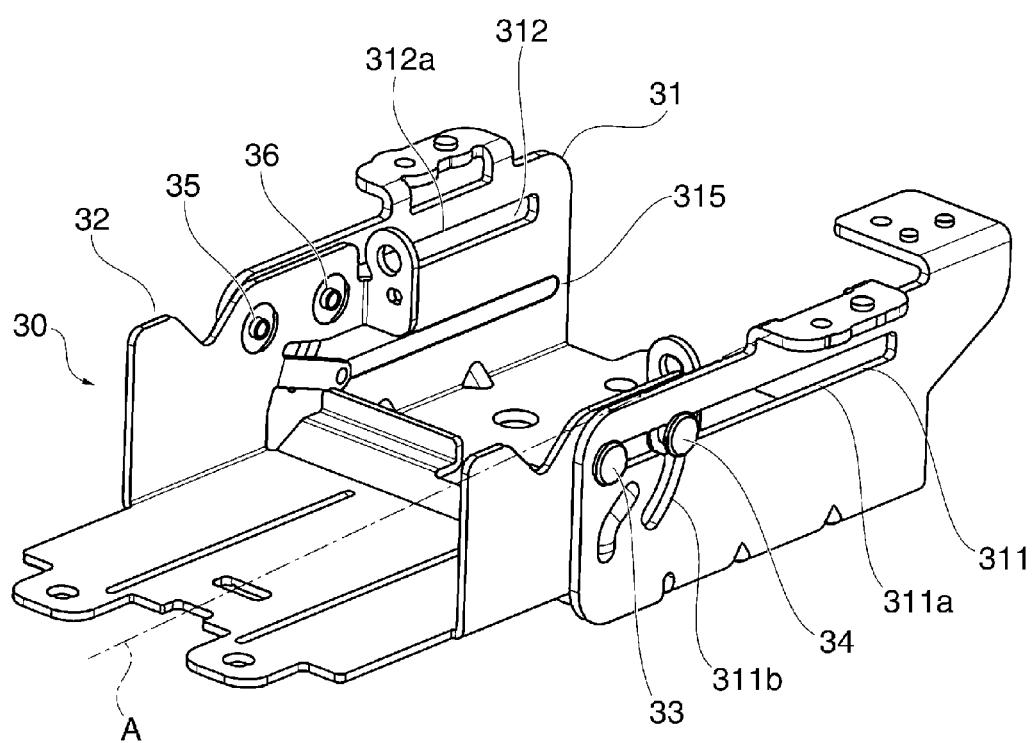
FIG. 3 is a perspective view showing a supporting mechanism that supports the viewfinder shown in FIG. 2 so as to enable to slide in the pulling direction and to rotate under the pulled state.

FIG. 3 is a perspective view showing the supporting mechanism 30 that supports the viewfinder 40 so as to enable to slide in the pulling direction and to rotate under the pulled state with respect to the camera body 1. As shown in FIG. 3, the supporting mechanism 30 has a base plate 31 that is fixed to the camera body 1, a holder 32 to which the viewfinder 40 is attached, and supporting shafts 33 through 36 that support the holder 32 so as to enable to slide and to rotate with respect to the base plate 31. The base plate 31 is equivalent to an example of the base member of the present invention, and the holder 32 is equivalent to an example of the holding member of the present invention.

The supporting shafts 33 through 36 are caulked to the holder 32 using metal caulking pins, for example, and the holder is slidably connected to the base plate 31. The supporting shafts 35 and 36 and the supporting shafts 33 and 34 are symmetrically arranged with respect to the center line A in the width direction of the supporting mechanism 30. In the first embodiment, left and right are defined as directions when viewing from the rear side of the camera body 1.

Figure 4A:
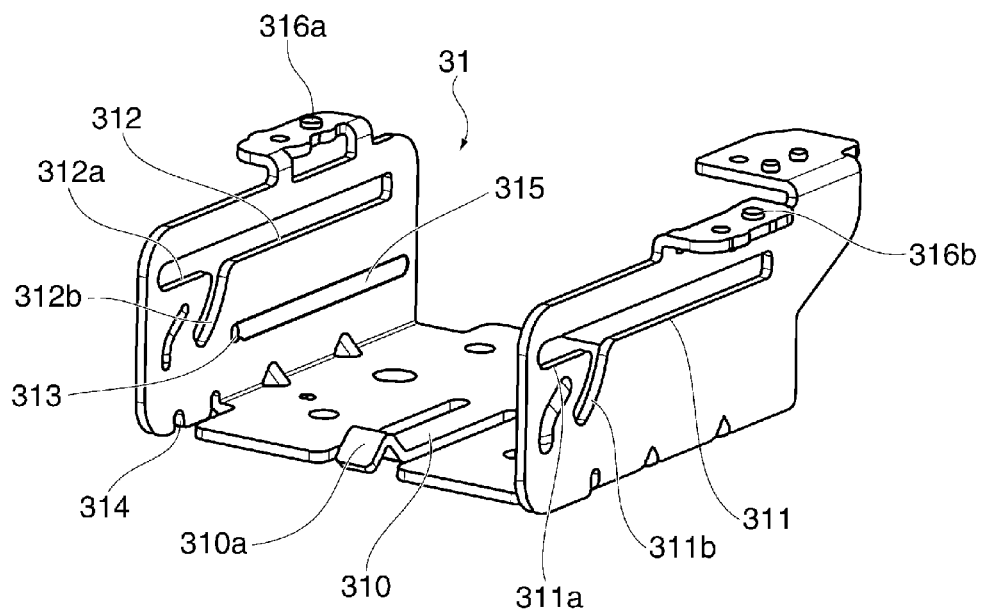
FIG. 4A is a perspective view showing a base plate of the supporting mechanism shown in FIG. 3.

FIG. 4A is a perspective view showing the base plate 31. As shown in FIG. 4A, the base plate 31 is shaped in the form of the letter U (U-shaped form), and a flat spring section 310, which has a projecting part 310a projected upward at the front end, is formed at the center in the width direction of the front end of the bottom wall section in the pulling direction of the viewfinder 40. Sliding rail sections 312 and 311 are formed on the right and left side wall sections, respectively.

The sliding rail section 312 has a linear rail 312a that linearly extends in the slide direction (the pulling direction) of the holder 32 and a circular rail 312b that circularly branches below at the front end side (left side in FIG. 4A) of the linear rail 312a. In the similar manner, the sliding rail section 311 has a linear rail 311a that linearly extends in the slide direction of the holder 32 and a circular rail 311b that circularly branches below at the front end side (left side in FIG. 4A) of the linear rail 311a.

Moreover, click slits 313 and 314, and a contact section 315 that contacts with the holder 32 when the holder 32 slides are formed on the left wall section of the base plate 31. Positioning bosses 316a and 316b that are positioned and fixed to the camera body 1 are formed on the upper sections of the left and right wall sections, respectively.

Figure 4B:
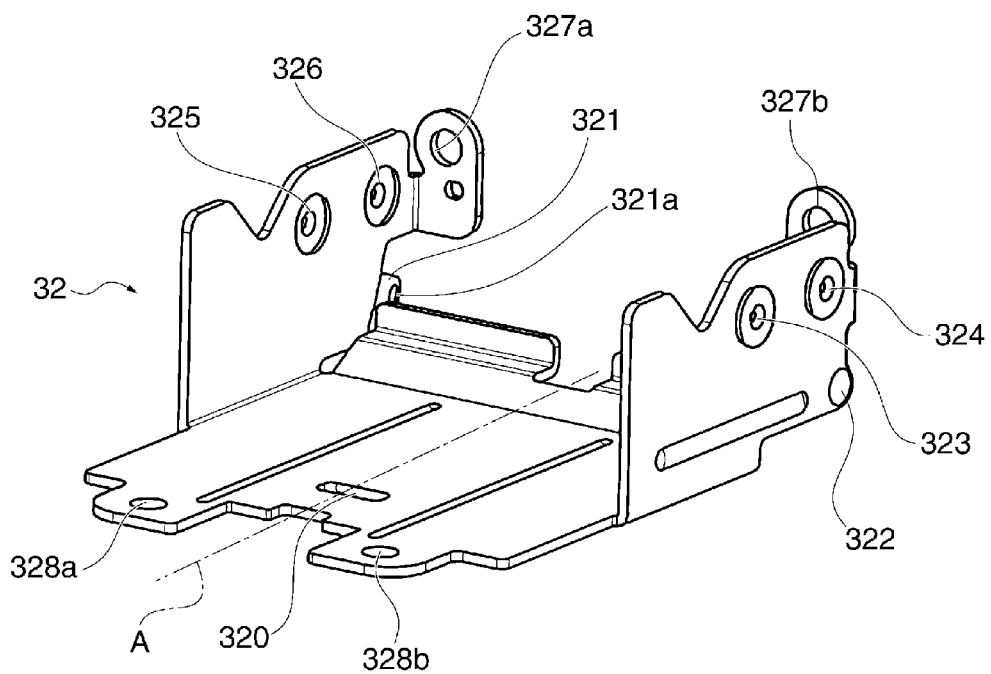
FIG. 4B is a perspective view showing a holder of the supporting mechanism shown in FIG. 3.

FIG. 4B is a perspective view showing the holder 32. As shown in FIG. 4B, the holder 32 is shaped in the form of the letter U (U-shaped form), and is arranged inside the base plate 31. A slit 320 that extends in the width direction is formed at the center of the bottom wall section in the width direction. When the holder 32 is retracted in the base plate 31, the projecting part 310a of the base plate 31 resiliently fitted to the slit 320, which gives a click-stop feeling.

Moreover, a flat spring section 321, which has a convex part 321a projected outward in the width direction, is formed at the rear end section of the left wall section of the holder 32 in the slide direction (pulling direction), and a convex part 322 projected outward in the width direction is formed at the rear end section of the right wall section of the holder 32. The convex part 321a and the convex part 322 are symmetrically arranged with respect to the center line A of the holder 32. The supporting shafts 33 through 36 are caulked to caulking seats 323 through 326, respectively. Although the flat spring section 321 is formed at the side of the convex part 321a in the first embodiment, a flat spring section may be formed at the side of the convex part 322, and flat spring sections may be formed on both sides of the convex part 321a and the convex part 322.

The supporting shafts 33 and 34 are caulked to the caulking seats 323 and 324, respectively, across the sliding rail section 311 of the base plate 31. The supporting shafts 35 and 36 are caulked to the caulking seats 325 and 326, respectively, across the sliding rail section 312 of the base plate 31. Thereby, the holder 32 and the supporting shafts 33 through 36 are supported so as to enable to slide along the sliding rail sections 311 and 312 of the base plate 31.

Figure 5A:
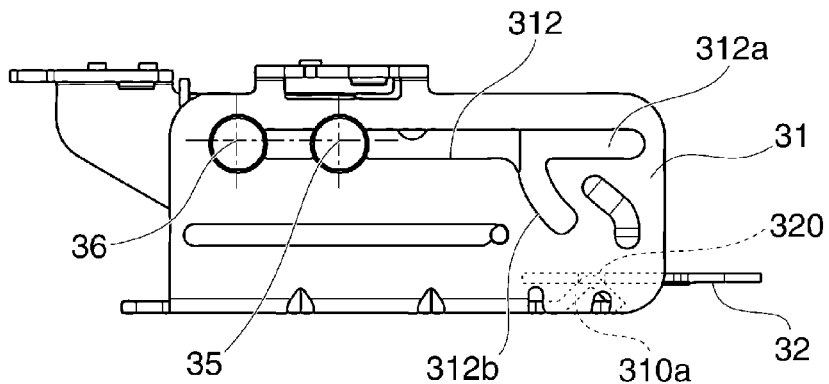
FIG. 5A is a side view showing the supporting mechanism shown in FIG. 3 in a state where the holder is retracted in the base plate.
Figure 5B:
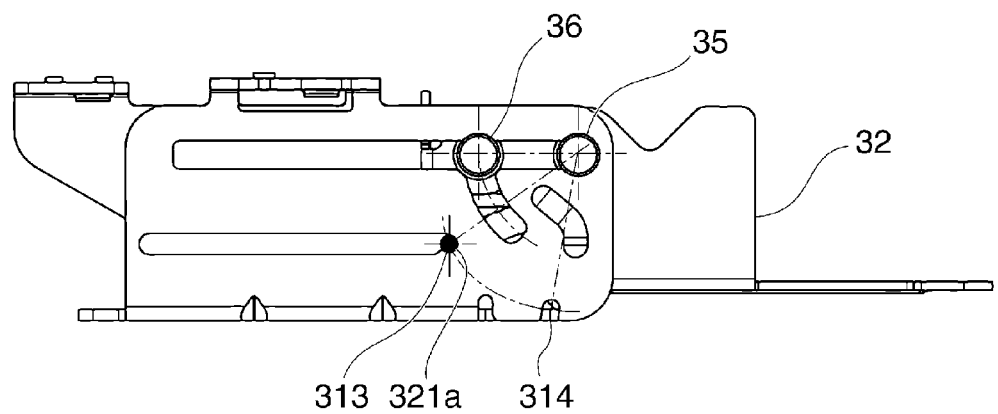
FIG. 5B is a side view showing the supporting mechanism shown in FIG. 3 in a state where the holder is pulled out from the base plate.
Figure 5C:
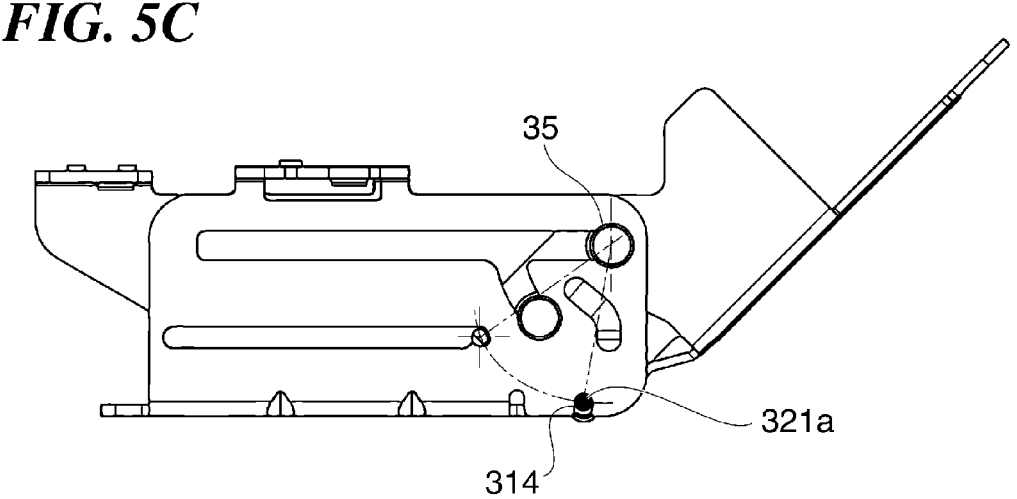
FIG. 5C is a side view showing the supporting mechanism shown in FIG. 3 in a state where the holder is rotated upward with respect to the base plate.

FIG. 5A is a side view showing the supporting mechanism in a state where the holder 32 is retracted in the base plate 31 (referred to as a retracted state of the holder 32, hereafter). FIG. 5B is a side view showing the supporting mechanism in a state where the holder 32 is pulled out from the base plate 31 (referred to as the pulled state of the holder 32). FIG. 5C is a side view showing the supporting mechanism in a state where the holder 32 is rotated upward with respect to the base plate 31 (referred to as a rotated state of the holder 32, hereafter). It should be noted that the rightward direction is equivalent to the pulling direction of the holder 32 in FIG. 5A, FIG. 5B, and FIG. 5C.

As shown in FIG. 5A and FIG. 5B, the supporting shafts 35 and 36 move in the pulling direction along the linear rail 312a of the base plate 31 from the retracted state of the holder 32a to the pulled state thereof. Then, in the pulled state of the holder 32, the supporting shaft 35 is located at the end of the linear rail 312a and the supporting shaft 36 is located at the branch point to the circular rail 312b.

In the retracted state of the holder 32, the holder 32 gives a click-stop feeling because the projecting part 310a is resiliently fitted to the slit 320 as shown by a broken line in FIG. 5A. In the pulled state of the holder 32, the holder 32 gives a click-stop feeling because the convex part 321a of the holder 32 is resiliently fitted to the slit 313 as shown in FIG. 5B.

Moreover, the supporting shaft 36 moves to the end of the circular rail along the circular rail 312b of the base plate 31 around the supporting shaft 35 from the pulled state of the holder 32 to the rotated state thereof. At this time, the convex part 321a of the holder 32 is resiliently fitted to the slit 314 formed on the base plate 31, which gives a click-stop feeling. The projecting part 310a, the slit 320, the slits 313, 314, and the convex part 321a are equivalent to examples of the click-stop mechanism of the present invention.

Figure 6A:
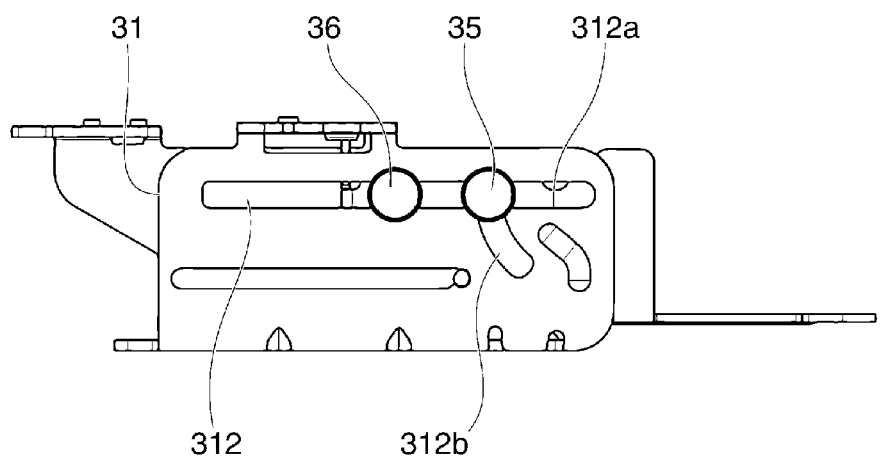
FIG. 6A is a side view showing the supporting mechanism shown in FIG. 3 in a state between a retracted state of the holder and the pulled state thereof.
Figure 6B:
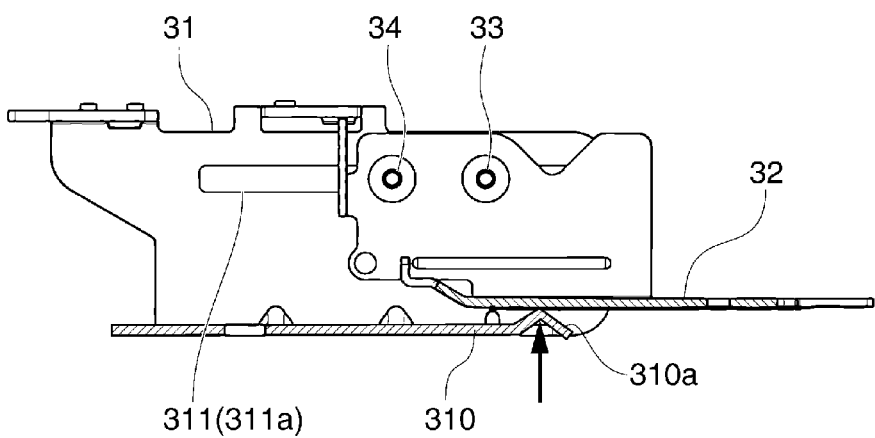
FIG. 6B is a sectional view showing the supporting mechanism in the state shown in FIG. 6A along a center line A.

FIG. 6A is a side view showing the supporting mechanism in a state between the retracted state of the holder 32 and the pulled state thereof. FIG. 6B is a sectional view showing the supporting mechanism in the state shown in FIG. 6A along the center line A.

As shown in FIG. 6A and FIG. 6B, when the holder 32 and the supporting shafts 33 through 36 move to the pulled state from the retracted state, the projecting part 310a formed on the base plate 31 contacts the bottom wall section of the holder 32, and the holder is pushed upward by the flat spring section 310.

This avoids that the supporting shaft 35 (33) at the right side in FIG. 6A in the slide direction of the holder 32 falls into the circular rail 312b (311b) of the base plate 31 even in a state where the supporting shaft 35 (33) comes to the branch position to the circular rail 312b (311b). Accordingly, the supporting shaft 35 (33) is able to move to the rail end along the linear rail 312a (311a). Moreover, the position of the holder 32 in the width direction is fixed because the convex part 322 of the holder 32 always contacts the side wall section (the right wall section in FIG. 4A) on which the sliding rail section 311 is formed.

Figure 7A:
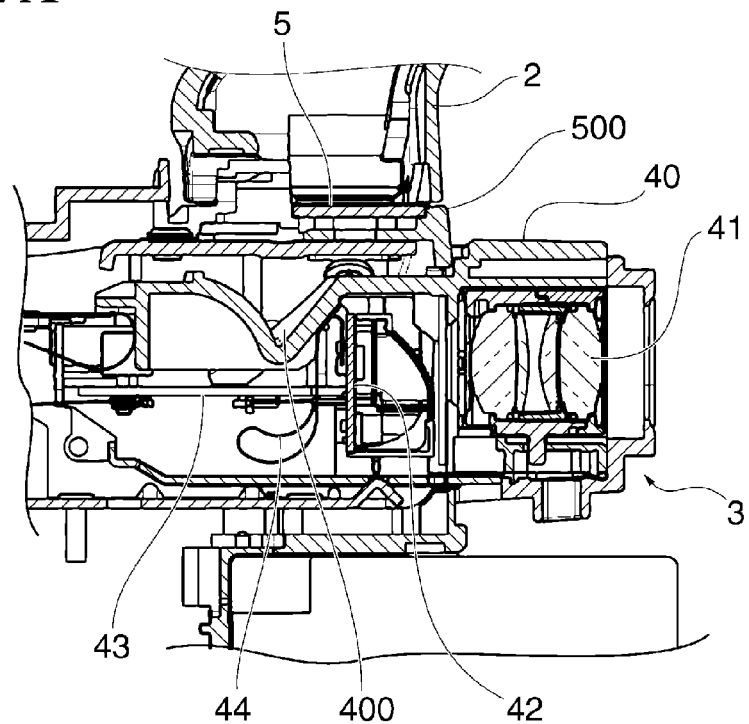
FIG. 7A is a sectional view showing a main part of the digital video camera shown in FIG. 1 in the state where the viewfinder is retracted in the camera body.
Figure 7B:
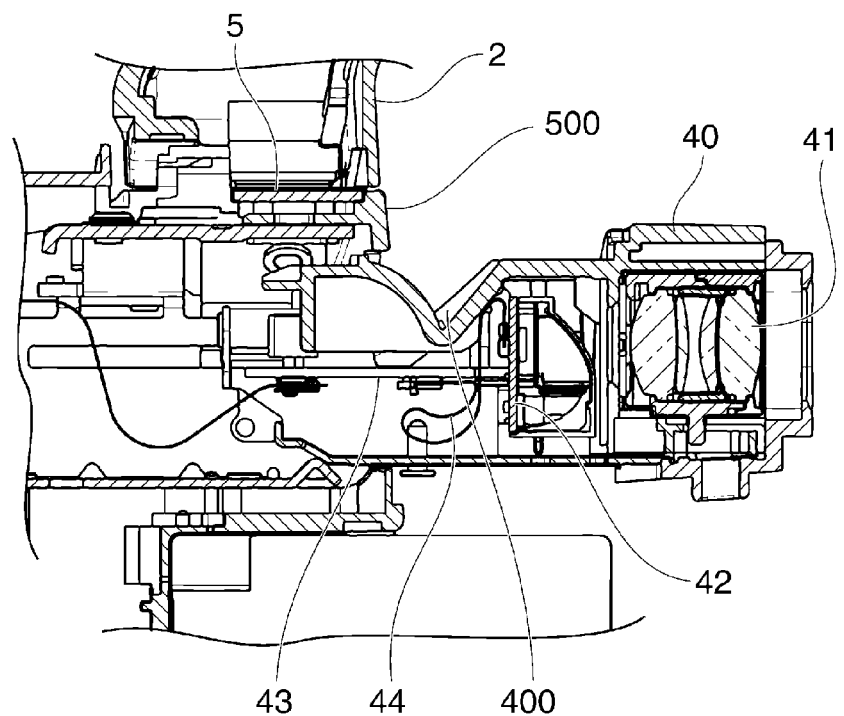
FIG. 7B is a sectional view showing the main part of the digital video camera shown in FIG. 1 in the state where the viewfinder is pulled out from the camera body.
Figure 8:
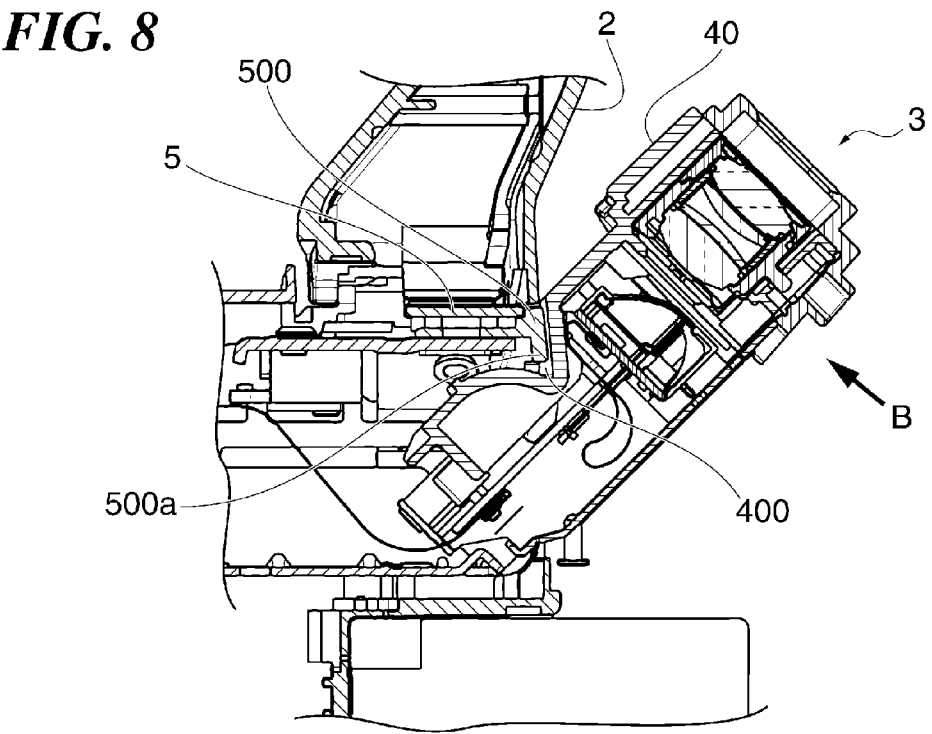
FIG. 8 is a sectional view showing the main part of the digital video camera shown in FIG. 1 in the state where the viewfinder is rotated upward with respect to the camera body.

FIG. 7 is a sectional view showing a main part of the digital video camera in the state where the viewfinder 40 is retracted in the camera body 1. FIG. 7B is a sectional view showing the main part of the digital video camera in the state where the viewfinder 40 is pulled out from the camera body 1. FIG. 8 is a sectional view showing the main part of the digital video camera in the state where the viewfinder 40 is rotated upward with respect to the camera body 1.

As shown in FIG. 7A, a lens unit 41, a display panel unit 42, and a CVF board 43 are provided inside the viewfinder 40. The CVF board 43 converts an image signal from the camera body 1 into a signal that is suitable for displaying on the display panel unit 42. The CVF board 43 and the display panel unit 42 are electrically connected through a flexible printed circuit board 44.

Moreover, the CVF board 43 is arranged along the pulling direction of the viewfinder 40 so that the substrate surface is parallel to the upper and lower wall sections of the viewfinder 40. A concave portion 400 that is depressed in the direction close to the CVF board 43 is formed in the upper wall section of the viewfinder 40. An appearance cover 500 is arranged just above the retraction space for the viewfinder 40 of the camera body 1, and the connector 5 to which the handle 2 is fixed is arranged on the appearance cover 500.

When the viewfinder 40 is rotated upward as shown in FIG. 8 from the pulled state shown in FIG. 7B, an edge 500a that is a part of the appearance cover 500 enters into the concave portion 400 formed on the viewfinder 40. That is, the concave portion 400 functions as an escape zoon for the edge 500a of the appearance cover 500.

Furthermore, the viewfinder 40 is positioned in the rotated state shown in FIG. 8 because the convex part 321a of the holder 32 is resiliently fitted to the slit 314 of the base plate 31 as shown in FIG. 5C. When the viewfinder 40 in this state is pushed upward as shown by an arrow B shown in FIG. 8, for example, the concave portion 400 of the viewfinder 40 contacts the edge 500a of the appearance cover 500, which prevents further rotation.

As described above, the supporting mechanism 30 that slidably and rotatably supports the viewfinder 40 by the base plate 31, the holder 32, and the supporting shafts 33 through 36, and that gives the click-stop feeling in the retracted state and the rotated state is constituted in the first embodiment. Thereby, since the number of parts of the supporting mechanism can be reduced and the configuration thereof can be simplified, the cost of the supporting mechanism can be reduced.

Moreover, the concave portion 400 corresponding to the edge 500a of the appearance cover 500 of the camera body 1 is formed as the escape zoon on the upper wall section of the viewfinder 40 so that the edge 500a of the appearance cover 500 enters into the concave portion 400 in the rotated state of the viewfinder 40 in the first embodiment. Since this concave portion 400 is provided, components of the camera body 1 are arranged within the rotation range of the viewfinder 40, which enables to arrange the handle 2 and the connector 5 for accessories just above the viewfinder 40. Thereby, the size of the digital video camera can be reduced because the space can be used effectively.

Figure 9A:
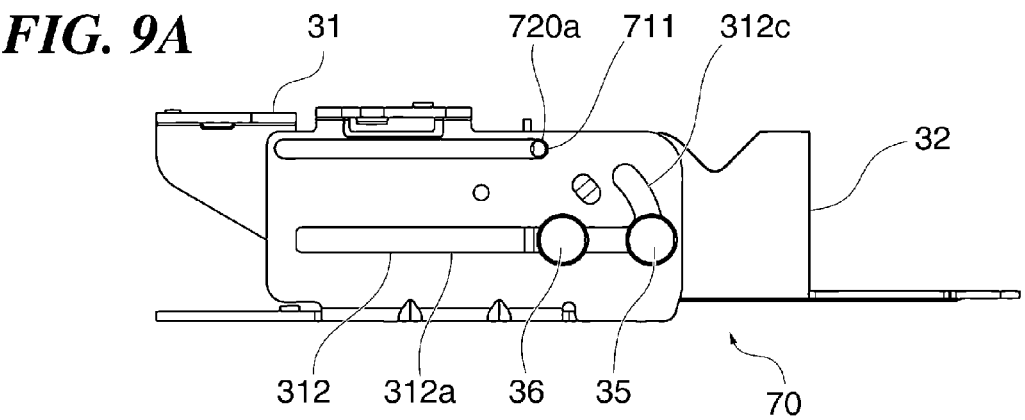
FIG. 9A is a side view showing a supporting mechanism mounted on a digital video camera as an image pickup apparatus according to a second embodiment of the present invention in a state where a holder is pulled out from a base plate.
Figure 9B:
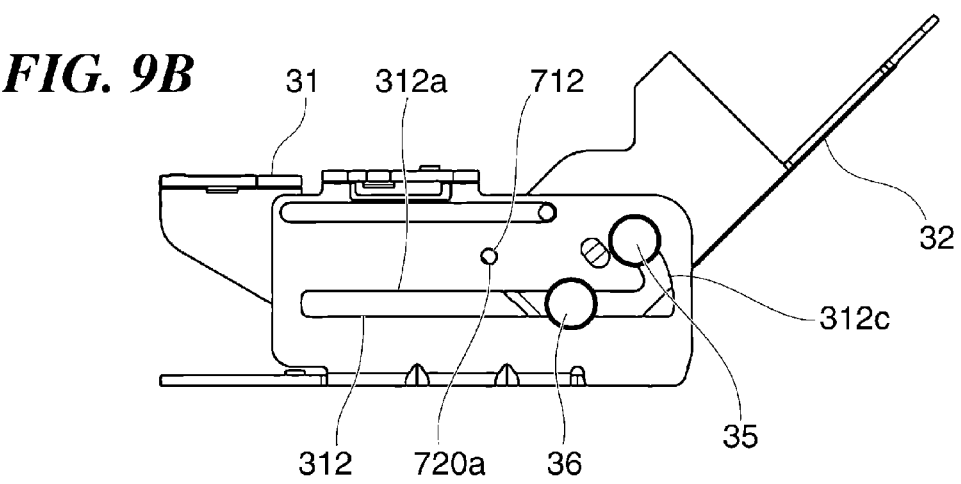
FIG. 9B is a side view showing the supporting mechanism in a state where the holder is rotated from the state in FIG. 9A.

Next, a digital video camera as an image pickup apparatus according to a second embodiment of the present invention will be described with reference to FIG. 9A and FIG. 9B. Since the second embodiment is different from the first embodiment in the supporting mechanism only, the same reference characters are given to the same and corresponding parts as the first embodiment, and only the supporting mechanism will be described. FIG. 9A is a view showing a supporting mechanism 70 in a state where a holder 32 is pulled out from a base plate 31. FIG. 9B is a view showing the supporting mechanism 70 in a state where the holder 32 is rotated.

In the above-mentioned first embodiment, the sliding rail section 311(312) formed on the base plate 31 of the supporting mechanism 30 consists of the linear rail 311a (312a) and the circular rail 311b (312b) that is circularly branched downward from the middle of the linear rail 311a (312a).

On the other hand, in the supporting mechanism 70 of the second embodiment, a sliding rail section 312 consists of a linear rail 312a and a circular rail 312c, as shown in FIG. 9A and FIG. 9B. The circular rail 312c is formed so as to be extended upward from the right end of the linear rail 312a in FIG. 9A. Although it is not illustrated, a sliding rail section (311) at the opposite side of the sliding rail section 312 also consists of a linear rail and a circular rail.

In the pulled state of the holder 32 shown in FIG. 9A, a click-stop feeling can be obtained because a convex part 720a formed on the holder 32 is resiliently fitted to a slit 711 formed on the base plate 31.

Then, when the holder 32 is rotated upward as shown in FIG. 9B, a supporting shaft 35 moves to the end of the circular rail 312c around a supporting shaft 36. In this rotated state, a click-stop feeling can be obtained because the convex part 720a formed on the holder 32 is resiliently fitted to a hole 712 formed on the base plate 31.

In the second embodiment, since the sliding rail section 312, the slit 711, and the hole 712 can be arranged in the optimal positions, the size of the supporting mechanism 70 can be further reduced. The other configurations and operation effects are the same as that of the above-mentioned first embodiment.

Figure 10A:
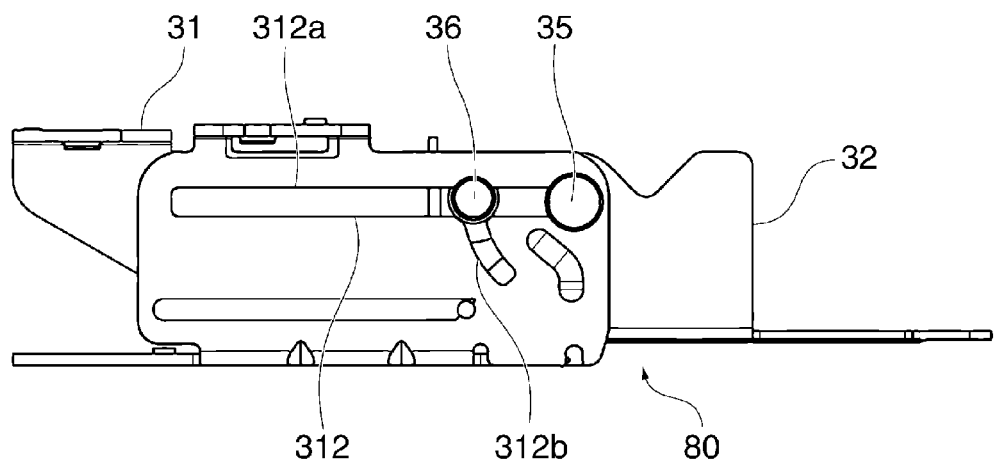
FIG. 10A is a side view showing a supporting mechanism mounted on a digital video camera as an image pickup apparatus according to a third embodiment of the present invention in a state where a holder is pulled out from a base plate.
Figure 10B:
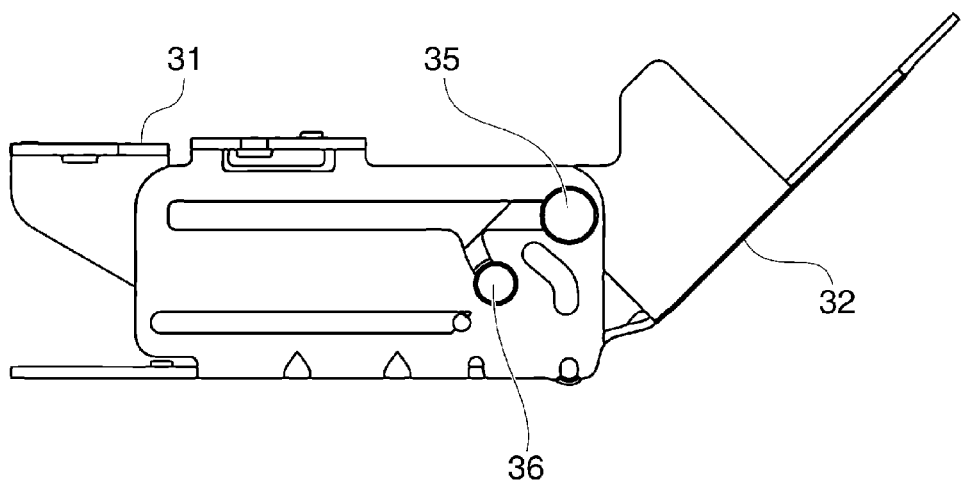
FIG. 10B is a side view showing the supporting mechanism in a state where the holder is rotated from the state in FIG. 10A.

Next, a digital video camera as an image pickup apparatus according to a third embodiment of the present invention will be described with reference to FIG. 10A and FIG. 10B. Since the third embodiment is different from the first embodiment in the supporting mechanism only, the same reference characters are given to the same and corresponding parts as the first embodiment, and only the supporting mechanism will be described. FIG. 10A is a view showing a supporting mechanism 80 in a state where a holder 32 is pulled out from a base plate 31. FIG. 10B is a view showing the supporting mechanism 80 in a state where the holder 32 is rotated.

In the supporting mechanism 80 of the third embodiment, a sliding rail section 312 formed on the base plate 31 consists of a linear rail 312a and a circular rail 312b as with the supporting mechanism 30 of the above-mentioned first embodiment.

However, the width of the circular rail 312b branched from the middle of the linear rail 312a is narrower than that of the linear rail 312a, and the diameter of a supporting shaft 36 is smaller than that of a supporting shaft 35. Although it is not illustrated, a sliding rail section (311) at the opposite side of the sliding rail section 312 also consists of a linear rail and a circular rail.

In the pulled state of the holder 32 shown in FIG. 10A, the holder 32 is pushed upward by the flat spring section (310) formed on a bottom wall section of the base plate 31 as with the above-mentioned first embodiment. Accordingly, the supporting shafts 35 and 36 slide along the linear rail 312a. As shown in FIG. 10B, when the holder 32 is rotated, the supporting shaft 36 moves to the end along the circular rail 312b.

In the third embodiment, the diameter of the supporting shaft 35 is larger than the width of the circular rail 312b. Accordingly, when the holder 32 is pulled out, the supporting shaft 35 does not fall into the circular rail 312b. Even when the viewfinder 40 is pulled out while pushing downward, the supporting shaft 35 certainly slides horizontally along the linear rail 312a. The other configurations and operation effects are the same as that of the above-mentioned first embodiment.

Figure 11A:
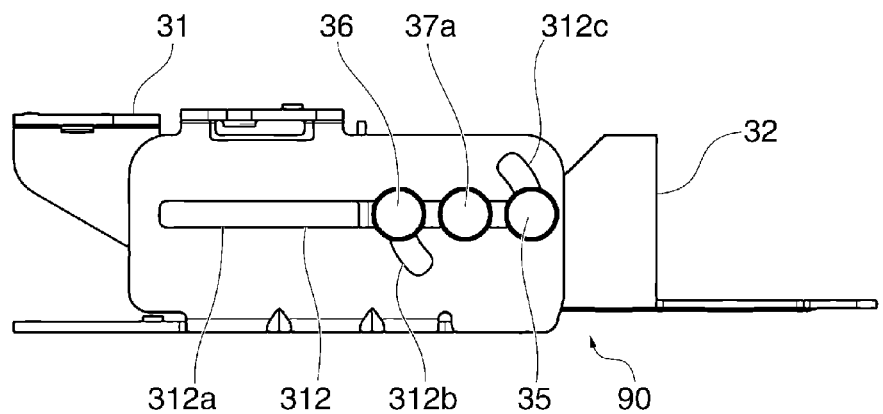
FIG. 11A is a side view showing a supporting mechanism mounted on a digital video camera as an image pickup apparatus according to a fourth embodiment of the present invention in a state where a holder is pulled out from a base plate.
Figure 11B:
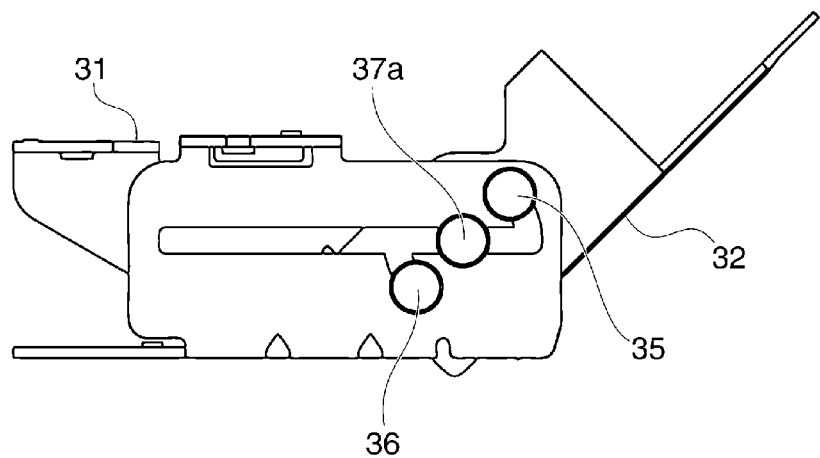
FIG. 11B is a side view showing the supporting mechanism in a state where the holder is rotated from the state in FIG. 11A.

Next, a digital video camera as an image pickup apparatus according to a fourth embodiment of the present invention will be described with reference to FIG. 11A and FIG. 11B. Since the fourth embodiment is different from the first embodiment in the supporting mechanism only, the same reference characters are given to the same and corresponding parts as the first embodiment, and only the supporting mechanism will be described. FIG. 11A is a view showing a supporting mechanism 90 in a state where a holder 32 is pulled out from a base plate 31. FIG. 11B is a view showing the supporting mechanism 90 in a state where the holder 32 is rotated.

The circular rails 311b and 312b are formed in only one direction with respect to the linear rails 311a and 312a, respectively, in the above-mentioned first embodiment. On the other hand, in the supporting mechanism 90 in the fourth embodiment, as shown in FIG. 11A, a sliding rail section 312 formed on the base plate 31 consists of a linear rail 312a, a first circular rail 312b, and a second circular rail 312c.

The first circular rail 312b is formed so as to circularly branch downward from a middle of the linear rail 312a as with the above-mentioned first embodiment. On the other hand, the second circular rail 312c is formed so as to circularly branch upward from the right end of the linear rail 312a in FIG. 11A as with the above-mentioned second embodiment.

Moreover, supporting shafts 35, 37a, and 36 are caulked to the holder 32 at the side of the sliding rail section 312. The supporting shaft 37a is arranged between the supporting shaft 35 and the supporting shaft 36. Although it is not illustrated, a sliding rail section (311) at the opposite side of the sliding rail section 312 also consists of a linear rail, a first circular rail, and a second circular rail, and three supporting shafts are caulked to the holder 32.

When the holder 32 is rotated as shown in FIG. 11B, the supporting shaft 36 moves along the first circular rail 312b around the supporting shaft 37a, and the supporting shaft 35 moves along the second circular rail 312c.

Since there are three pairs of the supporting shafts in the fourth embodiment, vertical backlash of the holder 32 when being pulled out can be further reduced. The other configurations and operation effects are the same as that of the above-mentioned first embodiment.

Next, a digital video camera as an image pickup apparatus according to a fifth embodiment of the present invention will be described with reference to FIG. 12A, FIG. 12B, FIG. 13A, FIG. 13B, and FIG. 13C. Since the fifth embodiment is different from the first embodiment in the supporting mechanism only, the same reference characters are given to the same and corresponding parts as the first embodiment, and only the supporting mechanism will be described.

Figure 12A:
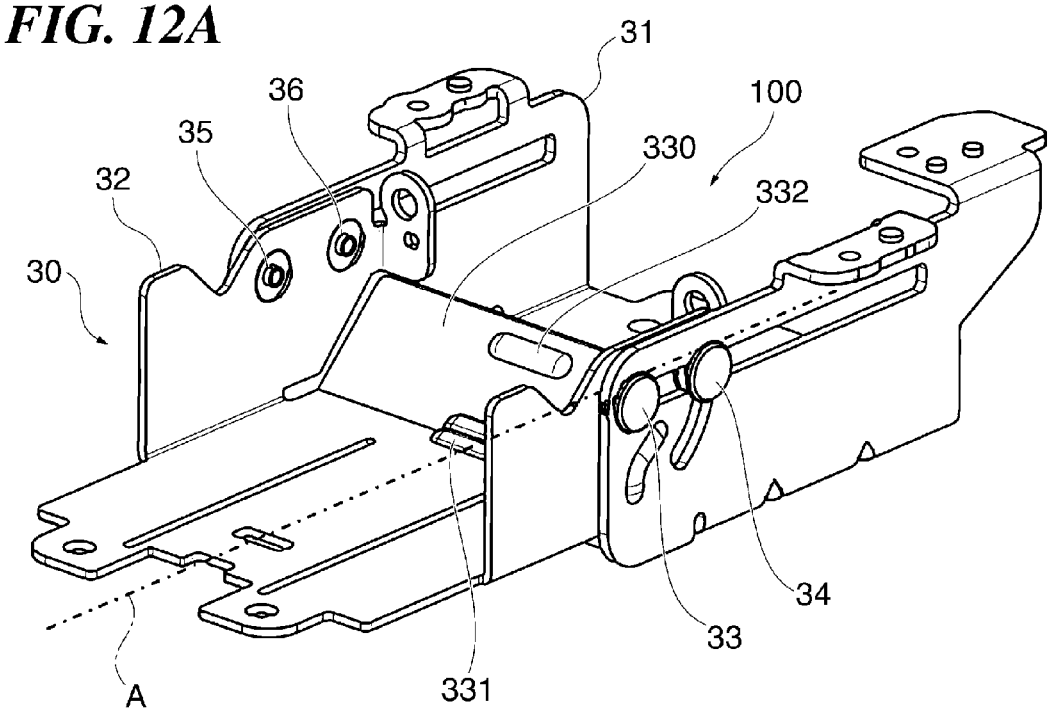
FIG. 12A is a perspective view showing a supporting mechanism mounted on a digital video camera as an image pickup apparatus according to a fifth embodiment of the present invention.
Figure 12B:
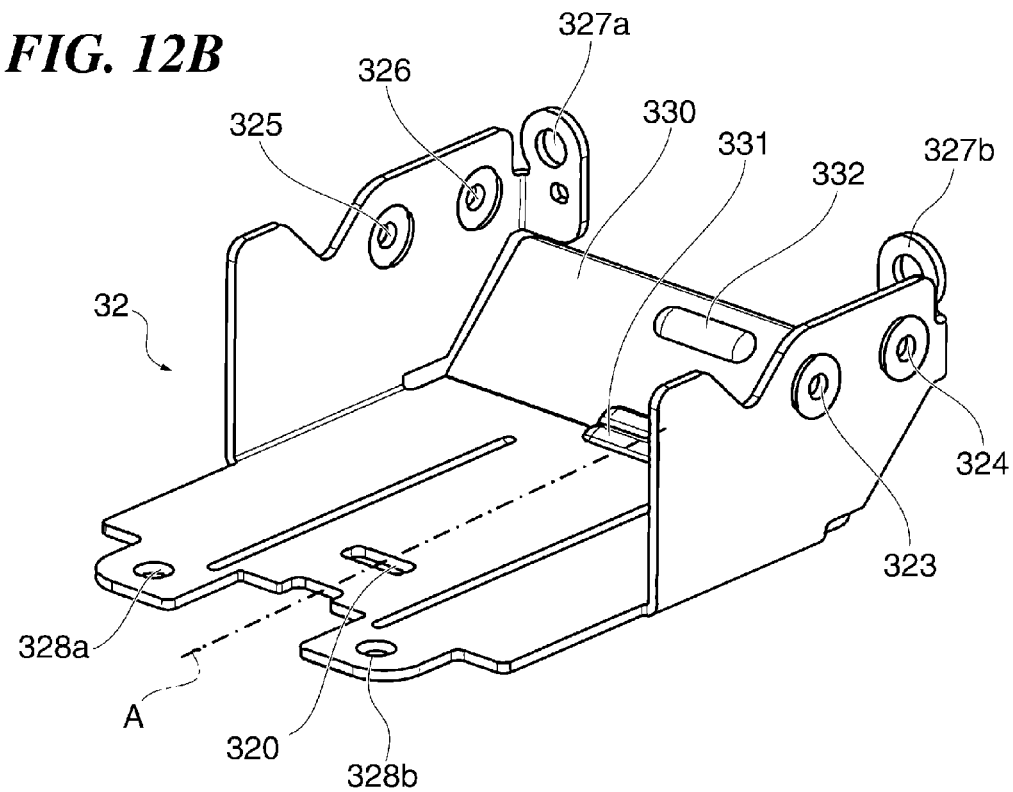
FIG. 12B is a perspective view of a holder that constitutes the supporting mechanism shown in FIG. 12A.

FIG. 12A is a perspective view showing a supporting mechanism 100. FIG. 12B is a perspective view showing a holder 32.

As shown in FIG. 12A and FIG. 12B, in the supporting mechanism 100 of the fifth embodiment, the holder 32 has an inclined wall 330, which inclines upward, in the rear section in the pulling direction of the holder 32. In the center area of the inclined wall 330 in the width direction, a first drawing form section 331 is formed at the bottom side, and a second drawing form section 332 is formed at the front end side.

Both of the first drawing form section 331 and the second drawing form section 332 have a shape formed by pressing from the back side to the front side. A concave portion 331a (see FIG. 13B) is formed on the back side of the first drawing form section 331, and a concave portion 332a (see FIG. 13C) is formed on the back side of the second drawing form section 332. The click-stop feeling can be obtained in the pulled state of the holder 32 and the rotated state thereof because a projecting part 310a of the base plate 31 is resiliently fitted to the concave portion 331a and the concave portion 332a, respectively.

Figure 13A:
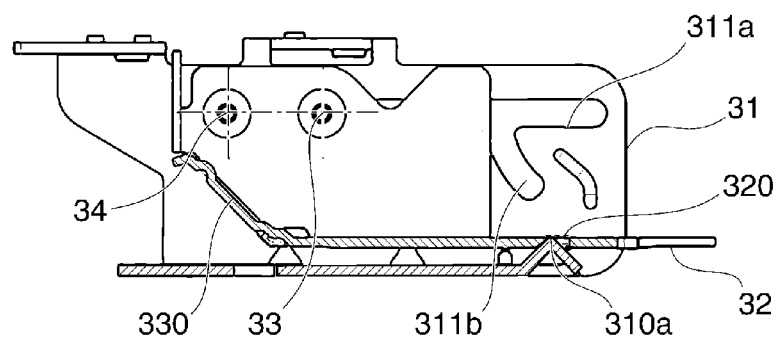
FIG. 13A is a sectional view showing the supporting mechanism shown in FIG. 12A in a state where the holder is retracted in the base plate.
Figure 13B:
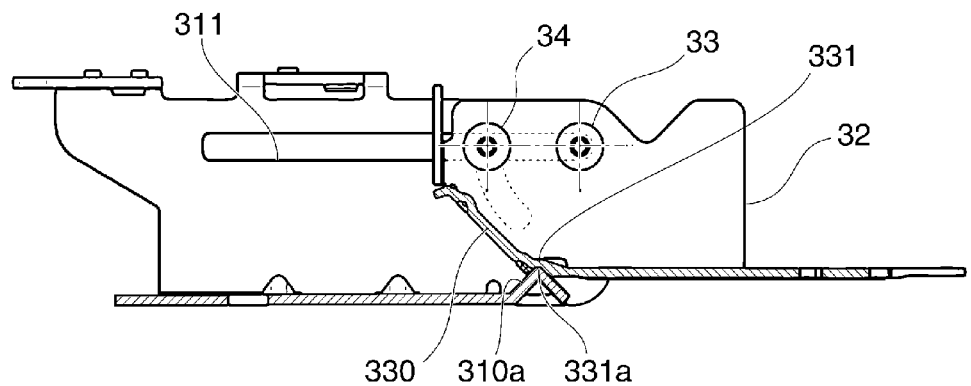
FIG. 13B is a sectional view showing the supporting mechanism shown in FIG. 12A in a state where the holder is pulled out from the base plate.
Figure 13C:
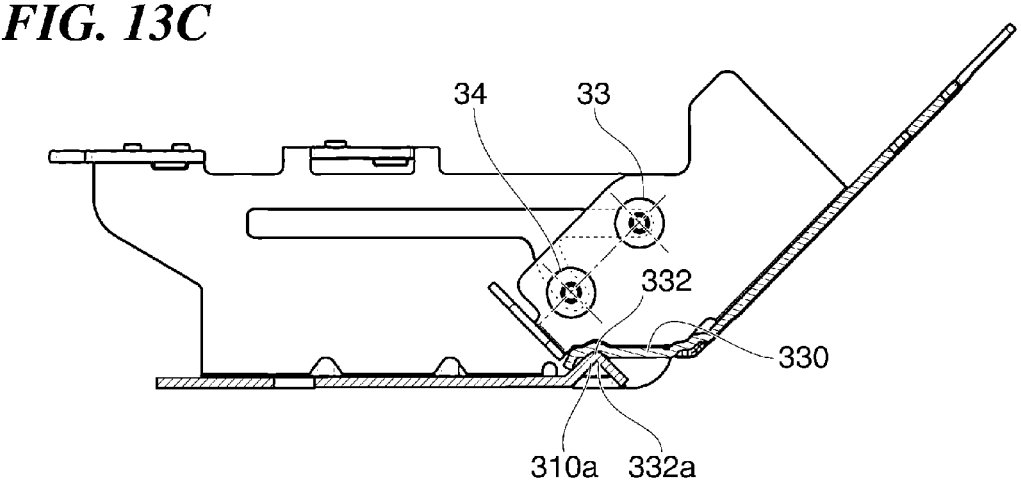
FIG. 13C is a sectional view showing the supporting mechanism shown in FIG. 12A in a state where the holder is rotated upward with respect to the base plate.
Figure 14A:
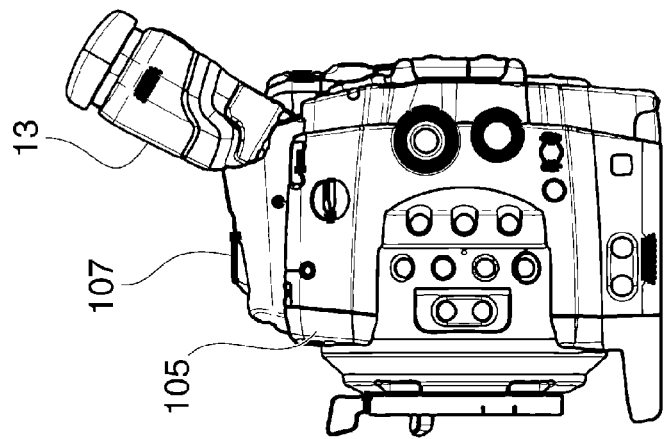
FIG. 14A through FIG. 14C are views showing an example of a digital video camera on which a conventional viewfinder supporting mechanism is mounted.
Figure 14B:
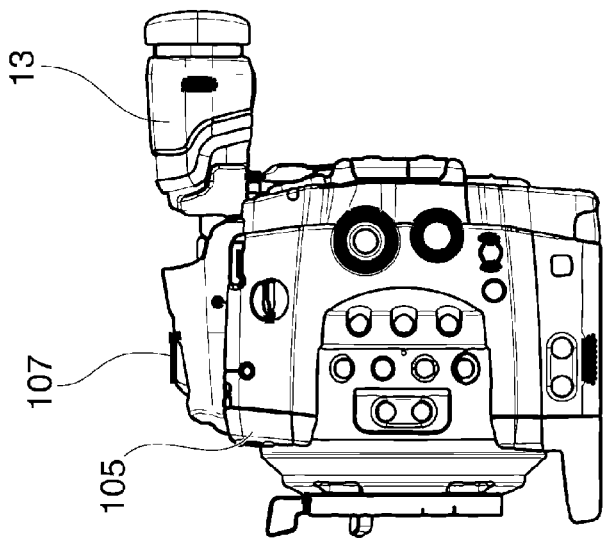
Figure 14C:
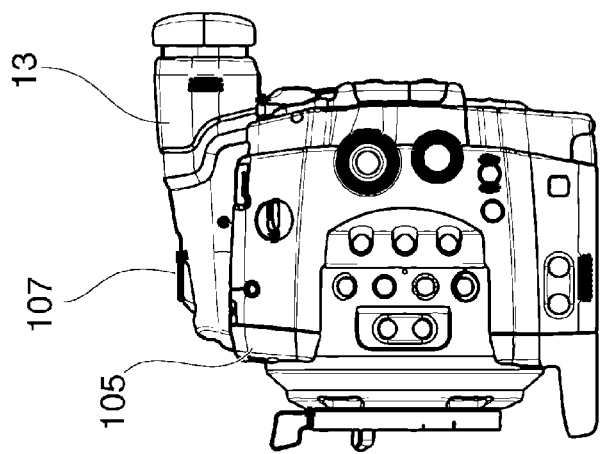
Figure 15B:
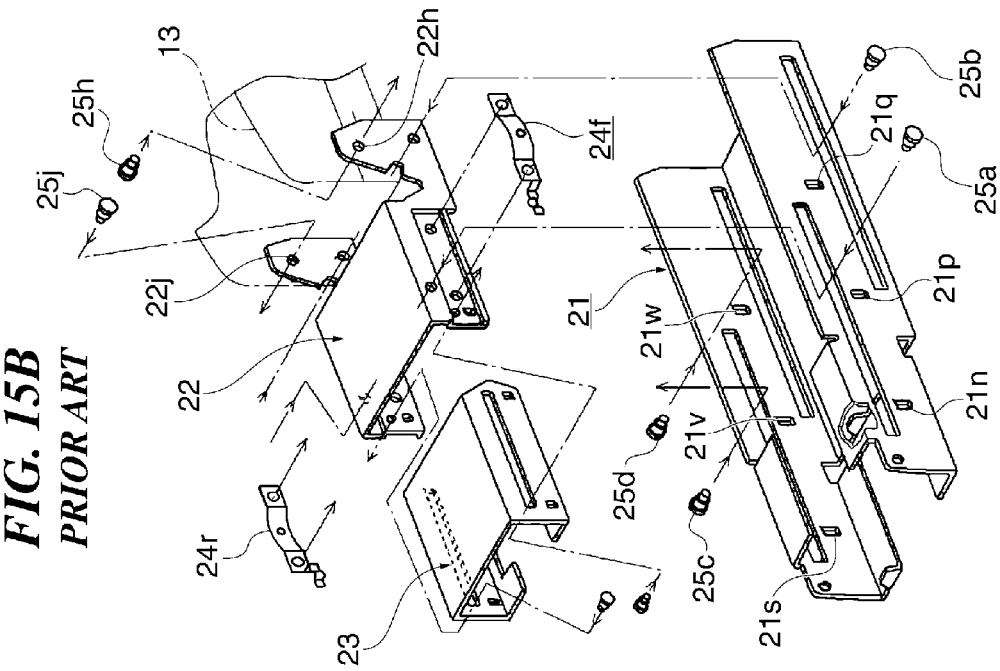
FIG. 15B is an exploded perspective view showing the conventional viewfinder supporting mechanism shown in FIG. 15A.
Figure 15A:
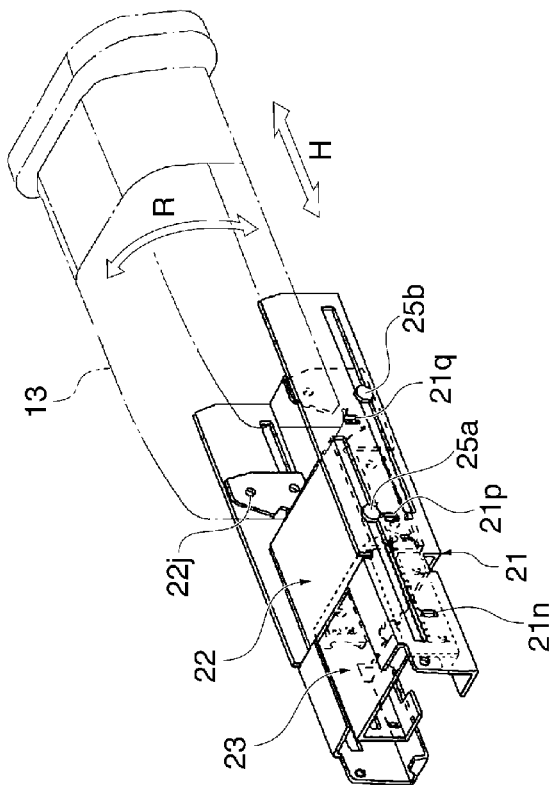
FIG. 15A is a perspective view showing the conventional viewfinder supporting mechanism.

FIG. 13A is a sectional view showing the supporting mechanism 100 in a state where the holder 32 is retracted in the base plate 31 (referred to as the retracted state of the holder 32). FIG. 13B is a sectional view showing the supporting mechanism 100 in a state where the holder 32 is pulled out from the base plate 31 (referred to as the pulled state of the holder 32). FIG. 13C is a sectional view showing the supporting mechanism 100 in a state where the holder 32 is rotated upward with respect to the base plate 31 (referred to as the rotated state of the holder 324).

It should be noted that FIG. 13A, FIG. 13B, and FIG. 13C are the sectional views along the center line A in FIG. 12A, and the rightward direction in the figures corresponds to the pulling direction of the holder 32. Moreover, FIG. 13A, FIG. 13B, and FIG. 13C do not show a linear rail (312a) and a circular rail (312b) of a sliding rail section (312) that is formed on the opposite side of the sliding rail section 311 and supporting shafts 35 and 36 that slide along the sliding rail section 312.

As shown in FIG. 13A and FIG. 13B, the supporting shafts 33 and 34 move in the pulling direction along the linear rail 311a of the base plate 31 from the retracted state of the holder 32 to the pulled state thereof. In the pulled state, the supporting shaft 33 is located at the end of the linear rail 312a and the supporting shaft 34 is located at the branch point to the circular rail 312b.

In the retracted state of the holder 32, as shown in FIG. 13A, the click-stop feeling can be obtained because the projecting part 310a of the base plate 31 is resiliently fitted to a slit 320 of the holder 32. The slit 320 is equivalent to an example of a first fitted part of the present invention.

In the pulled state of the holder 32, as shown in FIG. 13B, the click-stop feeling can be obtained because the projecting part 310a of the base plate 31 is resiliently fitted to the concave portion 331a of the first drawing form section 331 of the holder 32. The supporting shaft 34 moves to the end of the circular rail 312b along the circular rail 312b of the base plate 31 around the supporting shaft 33 from the pulled state of the holder 32 to the rotated state thereof. The concave portion 331a is equivalent to an example of a second fitted part of the present invention.

In the rotated state of the holder 32, as shown in FIG. 13C, the click-stop feeling can be obtained because the projecting part 310a of the base plate 31 is resiliently fitted to the concave portion 332a of the second drawing form section 332 of the holder 32. The concave portion 332a is equivalent to an example of a third fitted part of the present invention.

As described above, since the projecting part 310a of the base plate 31 is fitted to the slit 320, the concave portion 331a, and the concave portion 332a, which are formed on the holder 32, one by one, the click-stop feeling can be obtained in each of the retracted state, the pulled state, and the rotated state in the fifth embodiment. Accordingly, the configuration for obtaining the click-stop feeling in the retracted state, the pulled state, and the rotated state of the holder 32 can be simplified. The other configurations and operation effects are the same as that of the above-mentioned first embodiment.

It should be noted that the present invention is not limited to what has been described with the above-mentioned embodiments, quality of the material, a shape, a size, a formation, the number of elements, arrangement locations, etc., can be changed suitably unless it is deviated from the scope of the present invention.

For example, although there are two or three pairs of supporting shafts in the above-mentioned embodiments, there may be four or more pairs of supporting shafts.

Moreover, although the supporting shafts are caulked to the holder 32 in the above-mentioned embodiments, the supporting shafts may be connected with screws, adhesive, etc.

Furthermore, although the handle is connected to the upper section of the camera body 1 as accessories in the above-mentioned embodiments, a video light, an external microphone, etc. may be connected as accessories.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-076914, filed on Apr. 2, 2013, which is hereby incorporated by reference herein in its entirety.

What is claimed is:
1. An image pickup apparatus comprising:
an apparatus body;
a viewfinder configured to provide an image of a subject;
a base member which has at least one linear rail section and at least one circular rail section extended from the linear rail section, and which is fixed to the apparatus body; and a holding member which has a plurality of supporting shafts that can be slid along the linear rail section and the circular rail section, and which holds the viewfinder, wherein the holding member can be rotated with the viewfinder relative to the base member around one supporting shaft by sliding the other supporting shaft along the circular rail.

2. The image pickup apparatus according to claim 1, wherein the viewfinder is provided with a concave portion to which a part of an appearance cover of the apparatus body enters to prevent further rotation in the rotated state.

3. The image pickup apparatus according to claim 1, wherein the base member and the holding member are provided with a click-stop mechanism corresponding to each of the retracted state, the pulled state, and the rotated state of the viewfinder with respect to the apparatus body.

4. The image pickup apparatus according to claim 3, wherein the click-stop mechanism comprises a spring section that is provided on a bottom wall section of the base member and has a projecting part, first, second, and third fitted sections that are provided on the holding member, and wherein the projecting part is fitted to the first fitted section in the refracted state, the projecting part is fitted to the second fitted section in the pulled state, and the projecting part is fitted to the third fitted section in the rotated state.

5. The image pickup apparatus according to claim 4, wherein the spring section pushes the holding member upward during a pulling operation of the holding member because the projecting part contacts the bottom wall section of the holding member.

6. The image pickup apparatus according to claim 1, wherein the base member is provided with a spring section on a bottom wall section thereof that pushes the holding member upward during a pulling operation of the holding member because of contacting the bottom wall section of the holding member.

7. The image pickup apparatus according to claim 1, wherein the base member has side wall sections on which the linear rail section and the circular rail section are provided.

8. The image pickup apparatus according to claim 7, wherein a positioning section that is positioned and fixed to the apparatus body is formed on the upper section of each of the side wall sections at both sides of the base member.

9. The image pickup apparatus according to claim 8, wherein the holding member is arranged inside the side wall sections at both sides of the base member and has side walls at both sides to which the supporting shafts are connected.

* * * * *